United States Patent [19]
Asakawa et al.

[11] 3,766,443
[45] Oct. 16, 1973

[54] HIGH MOLECULAR WEIGHT SEMI-SOLID ELECTROLYTIC CAPACITOR

[75] Inventors: Shirow Asakawa; Sumio Nishiyama; Katsue Hasegawa, all of Kadoma City, Osaka, Japan

[73] Assignee: Matsushita Electric Industrial Company, Limited, Osaka, Japan

[22] Filed: June 23, 1972

[21] Appl. No.: 265,789

[52] U.S. Cl. .................................. 317/230, 29/570
[51] Int. Cl. .......................................... H01g 9/00
[58] Field of Search ...................... 317/230; 29/570; 136/25; 252/62.2

[56] References Cited

UNITED STATES PATENTS

| | | | |
|---|---|---|---|
| 1,930,165 | 10/1933 | Gage | 317/230 |
| 2,340,644 | 2/1944 | Clark | 307/88 ET |
| 2,758,093 | 8/1956 | Ernst | 317/230 |
| 3,365,626 | 1/1968 | Mohler et al. | 317/230 |
| 3,547,423 | 12/1970 | Jenny | 317/230 |

*Primary Examiner*—John W. Huckert
*Assistant Examiner*—Andrew J. James
*Attorney*—John Lezdey et al.

[57] ABSTRACT

This invention is directed to a semi-solid electrolytic capacitor and a method for fabricating the same. The semi-solid electrolytic capacitor comprises an anode electrode having an oxide film thereon, a cathode electrode and a semi-solid electrolyte intervening between the anode electrode and the cathode electrode and acting both as an electrolyte and a spacer. The anode electrode is substantially surrounded on both sides thereof by the cathode electrode and is spaced therefrom. The method comprises assembling an anode electrode and a cathode electrode, immersing the electrodes in an electrolyte comprising an ionogen, an organic solvent and a cross-linkable polyamide resin, and heating the electrolyte at a temperature of from 80° to 120°C for 0.5 to 1 hour to form a semi-solid electrolytic capacitor.

7 Claims, 8 Drawing Figures

24 27 15 20 25 11

HIGH MOLECULAR WEIGHT SEMI-SOLID ELECTROLYTIC CAPACITOR

This invention relates to a semi-solid electrolytic capacitor and to a method for fabricating the same.

Electrolytic capacitors that are well known in the art generally use liquid or solid electrolytes. A typical solid electrolytic capacitor commercially available uses manganese dioxide as an electrolyte. In order to have a solid electrolyte adhered to a valve metal such as aluminum, titanium or tantalum which is provided with an oxide film thereon by anodization, the valve metal is first coated with a manganese nitrate solution. The coated valve metal is then heated to decompose the manganese nitrate into manganese dioxide, which covers the entire surface of the valve metal. The above process should be repeated several times to provide an anode having the desired thickness of the manganese dioxide layer thereon. The solid electrolytic capacitor can be fabricated by contacting the surface of the manganese dioxide with a cathode. The thus obtained solid electrolytic capacitor is, however, disadvantageous in that the oxide film of the anode is seriously damaged during the repetition of the heating steps, and thus has degraded dielectric characteristics.

Another disadvantage of such solid electrolytic capacitor is that the process for fabricating the capacitor is very complicated due to the repetition of the heating steps.

On the other hand, a liquid electrolyte which comprises an anode of valve metal having an oxide film thereon, a cathode, and a spacer intervening between the anode and cathode electrodes, has far poorer electrical characteristics in comparison with those of the solid electrolytic capacitor. Furthermore, it is difficult to make the capacitor small in size, and the fabrication method of the capacitor is also undesirably very complicated.

It is therefore an object of the present invention to provide a semi-solid electrolytic capacitor which overcomes the disadvantages of the above-stated prior-art type of electrolytic capacitors.

It is another object of the present invention to provide a semi-solid electrolytic capacitor which is small in size and has an increased capacitance.

It is still another object of the invention to provide a semi-solid electrolytic capacitor which can be fabricated by a simple process and which is economical.

It is yet another object of the invention to provide a semi-solid electrolytic capacitor using a novel semi-solid electrolyte which acts as both an electrolyte and a spacer.

It is still another object of the present invention to provide a method adapted to produce the semi-solid electrolytic capacitor having the above-described features.

These and other objects and features of the present invention will become apparent from the following description taken in conjunction with the accompanying drawings wherein like reference numerals indicate similar elements.

In general, a semi-solid electrolytic capacitor according to this invention comprises a valve-metal anode electrode coated with an oxide dielectric film, a cathode electrode, and a semi-solid electrolyte intervening between the anode and cathode electrodes, the anode electrode being substantially surrounded on both sides thereof by the cathode electrode.

The anode electrode may be in the form of a relatively wide metallic plate or an elongated strip which is formed into a suitable shape. The cathode electrode may be in the form of a rectangular or other shaped tube or U-shaped and made of metallic plate, or may be an elongated metallic strip used for suitably surrounding the elongated strip of the anode electrode.

Furthermore, at least one surface, facing the anode electrode, of the cathode electrode may preferably be roughly finished so as to increase the surface area of the cathode electrode.

The above-stated capacitor can be constituted by using a novel semi-solid electrolyte which will be described in more detail hereinafter.

Figure 1A:
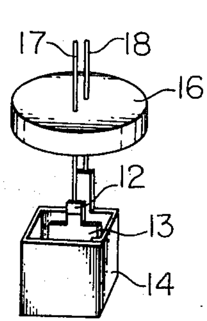
FIGS. 1A through 1C show a method of fabricating a semi-solid electrolytic capacitor of one embodiment according to the present invention.
Figure 1B:
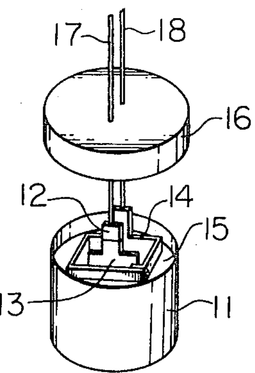
Figure 1C:
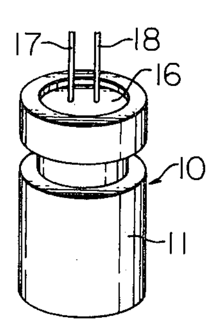

Referring now to the drawings and more specifically to FIGS. 1A to 1C, there is shown a capacitor 10 according to the invention which comprises a cup-like casing 11 made of a suitable material such as polypropylene or aluminum. In the casing 11 is positioned an anode plate electrode 12 made of a valve metal and having a thin and dense dielectric film 13 on the surface except at the upper portion thereof. The anode electrode 12 is inserted into a rectangular or other suitable shaped tube of the cathode electrode 14 made of a metal such as titanium, tantalum, aluminum or the like. It should be noted that at least the inner surface of the cathode electrode 14 is roughly finished by a chemical or mechanical means so as to increase the surface area of the metallic cathode as is well known in the art. The casing 11 is filled with a semi-solid electrolyte 15 so that the anode and cathode electrodes 12 and 15 are suitable immersed in the electrolyte 14, respectively. The casing 11 is sealed by a cap 16 through which wire-leads 17 and 18 are connected to the anode electrode 12 and cathode electrode 14, respectively and are extension thereof.

The valve metal electrode 12 may be either a plain foil made of a metal such as aluminum, titanium tantalum, niobium or other suitable metal, or may be such a metal etched by anodizing to such a degree as is desired to increase the surface area of the foil. The dielectric oxide film 13 is formed on the plain or etched electrode 12 by anodization treatment so that an adherent, dense dielectric oxide film is produced over the entire surface of the foil except the upper portion thereof which is required for providing an electrical connection.

Figure 2A:
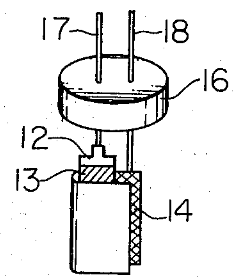
FIGS. 2A and 2B show another embodiment according to the present invention.
Figure 2B:
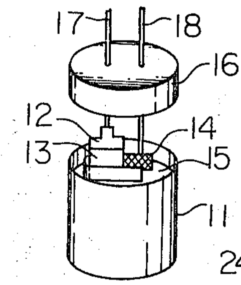

Another embodiment of a semi-solid electrolytic capacitor is shown in FIGS. 2A and 2B.

The capacitor 10 has the same construction as in FIGS. 1A to 1C except that a cathode electrode 14 is formed into a U-shape having two leg portions between which an anode electrode is placed. It should be kept in mind that the construction of the capacitor is so simple that it is suitable for mass-production.

Figure 3C:
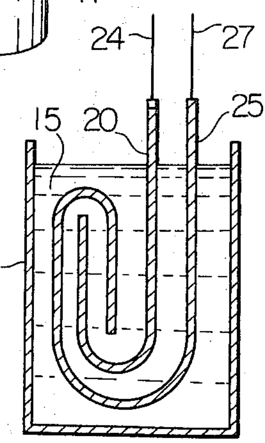
FIGS. 3A through 3C show a modified embodiment according to the present invention.
Figure 3A:
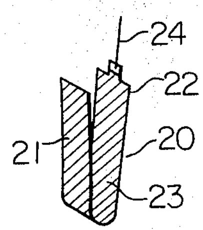
Figure 3B:
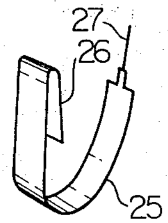

A further embodiment of a semi-solid electrolytic capacitor of the present invention is shown in FIGS. 3A to 3C.

The capacitor has a construction similar to that of FIGS. 1A to 1C and 2A and 2B except that the electrodes are rolled sheets.

Anode electrode 20 is formed into an elongated strip having a J-shaped cross-section. The elongated strip has a short leg portion 21 and a long leg portion 22. The anode electrode 20 is coated with an oxide dielectric film 23 except that upper portion of the long leg portion 22 for providing an electrical connection with a lead-wire 24.

On the other hand, a cathode electrode 25 is of larger shape similar to the anode electrode 20 but has a fore end portion 26 of the cathode electrode 25 which is inwardly bent. The anode and cathode electrodes 20 and 25 thus shaped are coupled with each other in a manner that the elongated strip of the cathode electrode 25 extends along the entire length of the outside of the anode electrode 20 and the fore end portion of the cathode electrode is turned inwardly around the upper end of the short leg portion 21 of the anode electrode 20.

It will be understood that the semi-solid electrolytic capacitor of this embodiment has an increased surface area of the two electrodes facing with each other, so that the capacitor can be made small in size with a great capacitance.

The semi-solid electrolytic capacitor shown in FIGS. 1A to 1C and 2A to 2B can be preferably fabricated by the following steps:

1. A thin metal foil or anode electrode made of a metal such as tantalun, titanium, aluminum or the like is prepared and a lead wire is connected to the upper portion of the foil.
2. The anode electrode is anodized to form an oxide dielectric film thereon except the upper portion thereof.
3. The anode electrode is assembled with a cathode electrode which is formed either into a rectangular tube (see FIG. 1A) or into a U-shape (see FIG. 2A) wherein the cathode electrode is connected with a lead wired and the lead wires of the electrodes are fixed through a cap.
4. The pair of electrodes are placed in a casing containing therein an electrolyte. (See FIGS. 1B and 2B)
5. The container is heated for 0.5 – 1 hour at a temperature of from 80° – 120°C for cross-linking the electrolyte into a semi-solid electrolyte.
6. The semi-solid electrolytic capacitor is thus obtained. (see FIG. 1C)

In this process, the electrolyte may be filled in to the container in the form of liquid while being maintained at a temperature of about 50°C, or in the form of uniform gel which is prepared by maintaining the same at a desired temperature between room temperature and 50°C after the electrolyte has once been heated up to 50°C. As the electrolyte is filled into the container in which the electrodes are positioned, the liquid electrolyte gradually turns to a uniform gel at a temperature from room temperature 50°C.

Furthermore, the pair of electrodes and the electrolyte may be placed in a container in lieu of the casing in practical application. In the case, the container should be made of a material which can stand heat and is chemically stable to the electrolyte. Moreover, the material used for the container is readily releasable from the semi-solid electrolyte without the electrolyte sticking to the wall of the container.

The semi-solid electrolytic capacitor shown in FIGS. 3A to 3C may be fabricated in a manner similar to the capacitor described above.

The semi-solid electrolyte of the invention is substantially composed of a cross-linked structure formed from a cross-linkable polymer such as a polyamide resin, an organic solvent capable of dissolving the resin and being captured in the cross-linked structure, and an ionogen having electrolytic ions migrating in the captured solvent. The electrolyte is in the state of gel at room temperature. When, however, the gel electrolyte is gradually heated up to about 50°C, it turns into a uniform liquid. When the temperature of the resultant liquid electrolyte drops to room temperature, the liquid again turns into a gel. Moreover, the electrolyte can be thermally set or cross-linked into a semi-solid electrolyte when heated at a temperature of 80° – 120°C for 0.5 – 1 hour. The thus obtained semi-solid electrolyte suffers no change at temperatures between-55° and 135°C.

The semi-solid electrolyte is advantageous in that the same has an excellent property of reforming an oxide dielectric film on the anode electrode when the oxide dielectric film is deteriorated and that it acts even as a spacer for preventing deterioration by contact between the anode electrode and the cathode electrode.

In this connection, where the assembly of the electrodes is inserted into the electrolyte, the two electrodes may appear to be partially in contact with each other. That is to say, the electrolyte which is heated to about 50°C to form a uniform liquid has high fluidity. Where a cathode electrode and an anode electrode surrounded by the cathode electrode are inserted together into the electrolyte liquid, the electrolyte passes into all the spacings between the two electrodes. When the electrolyte is heated to 100°C to give a semi-solid electrolyte, the parts of the electrode-assembly which may seem to be in contact with each other are found to be completely separated from each other by the semi-solid electrolyte formed. This is due to excellent adhesiveness of the semi-solid electrolyte to the metallic foil of the electrodes. Moreover, it is clear that the semi-solid electrolyte *per se* acts as a spacer. By using this particular semi-solid electrolytic of the invention, the constitution of the capacitor can be made simpler.

The preferred examples of components of the electrolyte for use in the semi-solid electrolytic capacitor of the present invention are described below.

The organic solvent used may preferably be amides such as dimethylformamide, dimethylacetoamide, pyrrolidone and the like, polyhydric alcohol such as ethylene glycol and and the like, or ethers or esters of the polyhydric alcohol such as methyl cellosolve, ethyl cellosolve and the like, sulfoxides such as dimethyl sulfoxide and the like, and compounds having a lactone group such as $\gamma$-butyrolactone.

The polyamide resin used includes an N-methylol nylon such as N-methylol 6-nylon, N-methylol 6,6-nylon or the like, N-methylol polyacrylamide, N-alkoxy methyl 6-nylon or 6,6-nylon, N-alkoxymethyl polyacrylamide and the derivatives thereof.

The ionogen may be picric acid, picamic acid, styphnic acid, nitrophenol, dinitrophenol and the ammonium, quartanary amine or alkaline earth metal salts thereof, preferably ammonium picrate, ammonium-p-nitrophenolate, triethylammonium-p-nitrophenolate, clacium-p-nitrophenolate, and barium-p- nitrophenolate. Moreover, a inorganic salt such as ammonium borate may be used.

The gelled electrolyte containing the above components therein maintains its semi-solid state as high as about 135°C. The semi-solid electrolyte of the present invention has properties similar to those of a paste-like electrolyte having the same components.

By way of example, the composition of the electrolyte of the invention may be as follows:

| | |
|---|---|
| N-methylol 6-nylon | 0.5 g |
| dimethylformamide | 4 ml |
| ammonium picrate | 1 g |
| picric acid | 0.1 g |

The above components were mixed together and heated to about 50°C to give a dense yellow liquid. The mixture was further heated to a temperature between 80°C and 120°C such as 100°C and maintained at this temperature for 1 hour to yield a semi-solid electrolyte.

The picric acid performs a catalytic action and accordingly the cross-linking velocity is accelerated by adding the picric acid.

The above-mentioned electrolyte was employed for the capacitor as shown in FIGS. 1A to 1C. The electric characteristics of the capacitor are given in Tables 1 and 2 in comparison with the conventional roll type electrolytic capacitor which uses a liquid electrolyte including ammonium picrate and a solid electrolyte using manganese dioxide as an electrolyte.

Furthermore, it has been found that the capacitor of the invention has the same frequency characteristics as an aluminum solid electrolytic capacitor and is an excellent frequency characteristics upon about 100 Khz.

The capacitor of FIGS. 2A to 2B has almost the same characteristics as the above described capacitor.

Moreover, the capacitor of FIGS. 3A to 3C is observed to have about 2 times of capacitance in comparison with the same-sized capacitor of FIGS. 1A to 1C and 2A to 2C.

It finally should be understood that the present invention is not limited to the rather illustrative devices or the process of fabricating the same since those skilled in the techniques may somewhat modify the specific capacitors and methods for fabricating the same set forth without going outside the scope of the inventive concept involved. Accordingly, appended claims are intended to cover all such equivalent variations as come within the true spirit and scope of the present invention.

What is claimed is:

1. A high molecular weight semi-solid electrolytic capacitor comprising a cathode electrode, an anode electrode facing and spaced from said cathode electrode, a cap member for connecting lead wires to said cathode and anode, a cylindrical case containing said cathode and anode electrodes, and a semi-solid electrolyte filling said case and consisting of a cross-linked polyamide resin, an organic solvent for dissolving said resin and captured in said cross-linked structure and an ionogen having electrolytic ions migrating in said solvent, whereby said cathode and anode electrodes are completely separated by said semi-solid electrolyte disposed therebetween.

2. A high molecular weight semi-solid electrolytic capacitor according to claim 1, wherein said cross-linked polyamide resin is selected from the group consisting of N-methylol 6-nylon, N-methylol 6, 6-nylon, N-methylol polyacrylamide, N-alkoxymethyl 6 nylon, N-alkoxymethyl 6, 6 nylon, N-alkoxymethyl polyacrylamide and derivatives thereof;

said solvent is selected from the group consisting of dimethylformamide, dimethylacetoamide, methyl cellosolve, ethyl cellosolve, dimethyl sufoxide and γ-butyrolactone; and said ionogen is at least one compound selected from the group consisting of ammonium picrate, ammonium-p-nitrophenolate, ammonium-p-dinitrophenolate, triethanol-p-nitrophenolate, calcium-p-nitrophenolate and barium-p-nitrophenolate, picric acid, picamic acid, styphnic acid, nitrophenol and dinitrophenol, and alkaline earth metal salts thereof.

TABLE 1.—TEMPERATURE CHARACTERISTICS

| | Rated value | Capacitance change ratio (percent) | | | Loss (μFΩ) | | |
|---|---|---|---|---|---|---|---|
| | | −55° C. | 20° C. | 85° C. | −40° C. | 20° C. | 85° C. |
| Semi-solid electrolytic capacitor of the invention | 25 WV/1μf | −7.5 | 0 | +5 | 120 | 50 | 50 |
| Roll type capacitor | 50 WV/1μf | −19.0 | 0 | | | 120 | |
| Aluminum solid electrolytic capacitor | 25 WV/1μf | −7.5 | 0 | +5 | 40 | 40 | 40 |

TABLE 2.—SHELF LIFE CHARACTERISTICS

| | Initial | | | 500 hours | | 1.000 hours | | 1.500 hours | |
|---|---|---|---|---|---|---|---|---|---|
| | C(μa.) | CR(μf.) | LC(μf.Ω) | C(μa.) | CR(μf.) | C(μa.) | CR(μf.) | C(μa.) | CR(μf.) |
| Semi-solid electrolytic capacitor of the invention | 1.58 | 53.3 | 0.4 | 1.63 | 53.3 | 1.63 | 57.5 | 1.70 | 65.1 |
| Conventional roll type capacitor | 1.13 | 116 | 2.8 | 0.95 | 207 | 0.81 | 314 | | |

3. A high molecular weight semi-solid electrolytic capacitor according to claim 1, wherein said semi-solid electrolyte is a mixture of 0.5 g N-methylol 6-nylon, 4 ml. dimethylformamide, 1 g. ammonium picrate and 0.1 g. picric acid.

4. A high molecular weight semi-solid electrolytic capacitor according to claim 1, wherein said cathode is in the form of box-shaped electrode and said anode is a plane element coated with an oxide film surrounded by said cathode electrode.

5. A high molecular weight semi-solid electrolytic capacitor according to claim 1, wherein said cathode is U-shaped and said anode is a plane element located between and parallel to the parallel portions of said cathode.

6. A high molecular weight semi-solid electrolytic capacitor according to claim 1, wherein said cathode and anode are formed of interleaved rolled sheets having a J-shape and spaced from each other.

7. Method of manufacturing a high molecular weight semi-solid electrolytic capacitor comprising: assembling anode and cathode electrodes, inserting the assembled electrodes into a semi-solid electrolyte in a container, heating the electrolyte from the room temperature to a first temperature at about 50°C and then to a second temperature between about 80°C and 120°C for 0.5 – 1 hour to gel the electrolyte, and removing the resultant assembly from the container, said electrolyte consisting of a cross-linked polyamide resin, an organic solvent for dissolving said resin and captured in said cross-linked structure and an ionogen having electrolytic ions migrating in said solvent.

* * * * *